United States Patent Office 2,880,226
Patented Mar. 31, 1959

2,880,226

MANUFACTURE OF ESTERS OF THIOPHOSPHORIC ACID

Willard D. Peterson, San Marino, and Morris Hein, Whittier, Calif., assignors to American Potash & Chemical Corporation, a corporation of Delaware No Drawing. Application May 24, 1955
Serial No. 510,850

1 Claim. (Cl. 260—461)

This invention relates to improvements in the procedures to be utilized in the manufacture of esters of thiophosphoric acid.

In recent years, the esters of thiophosphoric acid have come into widespread use for various purposes such as plasticizers and insecticides. This has led to an increased interest in the preparation of these esters to the end that a product may be obtained in high yield which is free of by-product esters or reactants so that the end product may be used as such without any involved or expensive purification or other processing.

It is in general the broad object of the present invention to provide an improved process for the manufacture of esters of thiophosphoric acid to the end that such ester can be produced in high yield and of good quality.

A further object of the present invention is to provide a process for the preparation of a dialkyl chlorothiophosphate of such purity that it may be used directly without isolation or other purification for the production of a high quality ester.

Another object of the present invention is to provide a process for the production of O,O-diethyl chlorophosphate of sufficient high purity to permit of its direct use without isolation for the production of a high quality parathion by reaction with sodium ethoxide.

The invention includes other objects and features of advantage, some of which will appear hereinafter wherein a further detailed description is given of a preferred manner of practicing the process of the present invention.

These objects are accomplished, according to the present invention, in the process for manufacture of thiophosphoric acid esters having the general formula:

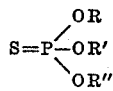

wherein R and R' are lower alkyl radicals, generally but not necessarily the same, and R" is an organic radical which is the residue of an alcohol or phenol.

The process is applicable to the formation of a variety of thiophopshoric esters and any alcohol which reacts with sodium may be used as one of the reactants, as will appear. Preferably, the alcohol should be an aliphatic alcohol, e.g., a lower alkyl alcohol such as methanol, ethanol 1 or 2-propanol, 1 or 2-butanol, various pentanols, or the like.

Various sodium salts of hydroxy organic compounds or the chemical equivalents thereof, e.g., a mixture of the hydroxy compound with NaOH, $Na_2CO_3$, or the like, may be used in the preparation of the mixed esters. Examples of usuable hydroxy organic compounds include: p-nitro phenol; 2,4-dinitrophenol; phenol; 2,4-dichlorophenol; 2-hydroxy-4-nitro naphthalene, 2-methyl-4-nitrophenol; p-cresol; 2-chloro-4-nitrophenol aliphatic alcohols, different from the one used in forming the dialkoxy derivative, glycols, such as ethylene glycol, diethylene glycol, etc., hydroxy ethers such as beta-butoxyethanol, methoxyethanol, beta(mercaptoethyl) ethanol to provide demeton, beta(mercapto-methyl) ethanol, etc., heterocyclic compounds such as 7-hydroxy coumarin, furfuryl alcohol, etc.; hydroxy sulfur compounds such as beta hydroxyethyl butyl sulfide; and the like. Of these, the aryl hydroxy compounds are preferred.

Using such reagents, a large variety of the esters of the general class indicated above can be prepared, some specific examples of which are parathion, demeton, dimethyl paranitrophenyl thiophosphate, dimethyl phenyl thiophosphate, diethyl parachlorophenyl thiophosphate, methyl ethyl 2,4-dichlorophenyl thiophosphate, and equivalent esters.

The process comprises reacting a sodium alcoholate in a liquid hydrocarbon having a boiling point above about 100° C. with thiophosphoryl chloride which has been separately prepared and which contains an unreacted alcohol corresponding to that used in manufacture of the sodium alcoholate. The so admixed materials react forming a reaction mixture containing an alkoxy thiophosphorus chloride. A sodium salt of a phenolic compound or aliphatic alcohol or substituted aliphatic alcohol within the general formula R"ONa, or the chemical equivalent thereof is then added directly to the resulting reaction mixture and the mixed materials are reacted, preferably in the presence of a suitable catalyst such as copper, an aliphatic tertiary amine, or a heterocyclic amine, e.g., pyridine and its homologues, e.g., any of the methyl pyridines and which are known as picolines, lutidines, mixed alkyl substituted pyridines, as well as pyridine substituted with higher alkyl groups such as propyl pyridine. The product is then recovered from the reaction mixture.

More specifically, as a result of our investigation, we have found a procedure for generating the required O,O-diethyl chlorothiophosphate in sufficiently high purity in the reaction mixture to allow for its direct use and without isolation for the production of a high quality parathion. This, we have discovered, can be accomplished by adding slowly a slurry of sodium ethoxide in an inert solvent to a mixture of thiophosphoryl chloride containing free ethanol while the reaction temperature is maintained between +5° C. to −20° C., the proportions which we prefer are from 2.02 to 2.20 moles of sodium ethoxide to a mole of the thiophosphoryl chloride, the latter containing at least 0.1 mole of free ethanol.

The thiophosphoryl chloride under these operating conditions is converted in at least 96% yield to the desired O,O-diethoxy chlorothiophosphate, as demonstrated by infra-red analysis and by the yield and quality of parathion produced when this mixture is further reacted directly with sodium paranitrophenate under suitable conditions.

The success of the operation, we find, depends upon avoiding the further reaction of the desired monochlorothiophosphate with sodium ethoxide to produce triethyl thiophosphate, and at the same time avoiding an insufficient quantity of sodium ethoxide which prevents conversion of the dichloride to the monochloride derivative. Parathion made from a monochloride containing these impurities not only leads to a product of less satisfactory quality, but to a lower yield. Further, the di(p-nitrophenyl) ethyl thiophopshate generated from dichloride impurity in the intermediate is extremely difficult to remove from the finished product.

One prior disclosure teaches a process for the preparation of parathion involving the direct reaction of sodium paranitrophenate with a reaction mixture obtained by the addition of specified quantities of sodium ethoxide, ethanol, and thiophosphoryl chloride. Operating under the conditions we prescribe herein results in conversion of the thiophosphoryl chloride to the desired intermediate with less than a 90% yield.

We have determined that the improved yield attained by the procedure of the present invention depends upon the addition of the alcohol to the thiophosphoryl chloride; two-tenths of a mole of alcohol per mole of thiophosphoryl chloride creates a decided improvement in yield and purity of the desired product. More alcohol than this has further beneficial effect, but the improvement attendant upon use of more than one mole is not discernible. However, we do not restrict the upper limit in the quantity of alcohol which can be added.

The following example illustrates in more detail the actual operations involved in one practive of the process.

*Example 1.*—A 20% slurry of sodium ethoxide in toluene is made from 2.08 moles (48 grams) of dispersed sodium metal, 2.19 moles (101 grams) of absolute ethanol, and 560 grams of toluene. The procedure for this operation is described in Du Pont's "Sodium Products Bulletin SP24–161," having the title "Preparation of Sodium Alkoxides."

This resulting smooth slurry is added slowly to a cold solution made by adding 87.5 grams (1.90 moles) of absolute ethanol to 169.5 grams (1.0 mole) thiophosphoryl chloride dissolved in 199 grams of toluene. This is achieved with good agitation while the temperature of the reaction mixture is maintained between —10° C. and 0° C. and an addition time of 90 minutes. The reaction mixture is stirred for thirty minutes after the addition of the ethoxide and during this period the temperature can rise to 15° C., when it is ready for the next step of the synthesis. The mixture is then introduced into hot toluene in which is suspended 180.5 grams (1.12 moles) of anhydrous sodium paranitrophenate. Under the conditions, the ethanol and some of the toluene distill, leaving a toluene solution containing essentially one mole of O,O-diethyl chlorothiophosphate in which is suspended 1.12 moles of sodium paranitrophenate. The distillate, consisting of dry toluene and ethanol, is held for recycle to the thiophosphoryl chloride for the preparation of more O,O-diethyl chlorothiophosphate.

We have found that the toluene solution of the chloro derivative containing the suspended sodium paranitrophenate reacts extremely slowly at its reflux temperature (114° C.). This reaction, we have discovered, is best catalyzed by the addition of small quantities of heterocyclic amines such as pyridine and substituted pyridines such as picoline, lutidine, and related compounds. The above mixture of these materials, we have found, reacts completely in two to three hours at 95–100° C. when approximately one percent by weight of such an amine, e.g., picoline, is introduced to the system. The reaction mixture is processed by washing out the by-product, sodium chloride, followed by extracting with acid and soda ash solutions to remove the picoline and unreacted nitrophenate respectively, followed by removal of the toluene which is recovered for recycle to the process, to leave a parathion of high quality.

Further details of the reaction between sodium paranitrophenate and the O,O-diethyl thionochlorophosphate are set forth in the following.

*Example 2.*—The diethyl thiono chlorophosphate was prepared by placing 169.5 grams (1.00 mole) of thiophosphoryl chloride and 418 grams (4.54 moles) of toluene in a dry, 3-liter, 3-neck flask equipped with a mechanical Hershberg stirrer, thermometer, addition funnel, and a vent carrying a drying tube containing anhydrous calcium sulfate. The agitated solution was cooled to —5° to —10° C. and 18.4 grams (0.4 mole) of absolute ethanol was added in approximately one minute. Two moles of sodium ethylate dispersion in toluene was then added at uniform rate, over a two-hour period, while maintaining the temperature between 0° C. and —5° C. This reaction was highly exothermic and required efficient cooling facilities, especially during the first three-fourths of the ethylate addition, after which time the reaction became more moderate. When the addition was completed, the reaction mixture was kept at about 0° C. for another 30 minutes and then warmed to room temperature. The yield, in situ, of diethylchlorothionophosphate was 95–96% as determined by infra-red analysis (15.22 microns) and was ready for use in the next step of the synthesis.

The sodium para nitrophenolate was prepared in a 4-liter, 3-neck flask equipped with a mechanical stirrer, a thermometer, and an entrainment trap to which was attached a downward condenser connected to a water-cooled water trap arranged so that the organic distillate may be removed or returned to the reaction flask. Into the flask was placed 132.1 grams (0.95 mole) of p-nitrophenol, 100.7 grams (0.95 mole) of anhydrous sodium carbonate, and 600 grams (6.51 moles) of toluene. The stirred mixture was heated to 60–65° C. and 40 ml. (2.2 moles) of water was added. No sodium p-nitrophenoxide is formed until water is added. This temperature was maintained for one hour and then raised to remove water by azeotropic distillation (toluene-water azeotrope at 84.1° C.). Toluene was allowed to return to the system until 39 ml. of water had been removed from the water trap, essentially complete removal of the added water, after which time the total distillate was continuously removed until entirely free of water, as shown by the absence of turbidity in the toluene. A total of 312 grams of toluene was removed. At this point, the reaction and overhead temperatures were within one degree of each other (110–111° C.) and the toluene layer was colorless, indicating complete conversion of paranitrophenol to the sodium salt. Sodium p-nitrophenoxide exists as a dihydrate between 36° and 110° C. Hence a slight excess of water over the theoretical amount needed to form this dihydrate was used to ensure a wet system, which is required to form this salt. Too much water causes a pasting effect and leads to a clumped rather than dispersed salt. Clumped material led to very poor yields of the paranitrophenyl diethyl thionophosphate. Final heating leads to the dispersed, anhydrous, bright orange salt. The finely dispersed sodium salt was cooled to 70° C. and was then ready for the addition of the toluene solution of O,O-diethylchlorothionophosphate to it for carrying out the final synthesis.

The toluene solution of O,O-diethylchlorothionophosphate was added to the sodium p-nitrophenoxide dispersion, both having been prepared as described above, and the highly agitated mixture was heated to 105°–110° C. During a twenty-minute period, 134 grams of distillate, consisting primarily of toluene, together with some ethanol, was removed from the system. Refractive index and specific gravity measurements showed that about nineteen out of a possible twenty-three grams of ethanol were removed in this distillate. A more complete removal of ethanol would have eliminated more completely the chance of formation of O,O,O-triethylthiophosphate, thereby allowing a possible greater conversion of paranitrophenol. This is especially true because the triester is readily formed from diethylchlorothionophosphate and alcohol in the presence of picoline. Five milliliters (4.7 grams) of picoline was then added to the reaction flask and the temperature maintained between 107° C. and 109° C. for two hours. Color changes were evident during this reaction. The orange of sodium p-nitrophenoxide gradually changes to tan, then to pea-green, and finally to dark brown. During this time, distillation took place very slowly and 43.5 grams of distillate (essentially toluene) was removed. The reaction mix was allowed to cool to 25° C.

The purification and isolation of the product was carried out in the following manner. To the cooled (25° C.) dark brown toluene solution containing suspended salt was added 700 ml. of water. The resulting yellow-colored 20% brine solution having a pH of 9.27, as well as a small amount of brown scum, was separated, extracted twice with 250 ml. of toluene, and the extracts added to the organic phase. The scum was removed at this stage so that its presence would not contaminate the drying agent used in the final purification step. The scum is removed at the expense of allowing some toluene solution of the product to enter the brine. However, this toluene solution is recovered in subsequent extraction operations and returned to the process.

The organic phase was washed in turn with three 200 ml. portions of cold 2.5% $Na_2CO_3$ solution to remove unreacted p-nitrophenol, and then with two 200 ml. portions of 5% $H_2SO_4$ solution to remove last traces of $Na_2CO_3$ and picoline. Two 200 ml. water washes were used to ensure removal of the sulfuric acid from the toluene solution.

Steam distillation of the toluene solution was carried out in the original reaction flask, and led to a recovery of 1,323 grams of toluene and 400 ml. of water. Further steam distillation drove over 2.5 grams of an organic material, determined to be diethylchlorothionophosphate.

The product remaining in the flask was separated from the water and weighed 270 grams. Drying with 20 grams of silica-gel yielded 256.7 grams (0.88 mole) of dry product, paranitrophenyl diethylchlorothionophosphate. This corresponds to a yield of 92.6% based on p-nitrophenol and 87.7% based upon the phosphorus trichloride introduced to the process.

We claim:

A process for the preparation of diethylchlorothionophosphate comprising: adding ethanol to thiophosphoryl chloride in the proportion of from about 0.1 mole to about 1 mole of ethanol per mole of thiophosphoryl chloride to form a first reaction mixture, then slowly adding a slurry of sodium ethoxide in an inert solvent to said first reaction mixture to form a second reaction mixture, maintaining the temperature of the second reaction mixture between about −20° C. and about 5° C., the sodium ethoxide slurry being added to the first reaction mixture in the proportion of from 2.02 to 2.2 moles of sodium ethoxide per mole of thiophosphoryl chloride initially added to form the first reaction mixture.

References Cited in the file of this patent

UNITED STATES PATENTS

| | | |
|---|---|---|
| 2,471,464 | Toy | May 31, 1949 |
| 2,571,989 | Schroder | Oct. 16, 1951 |
| 2,575,224 | Manske et al. | Nov. 13, 1951 |
| 2,657,229 | Orochena | Oct. 27, 1953 |
| 2,663,721 | Dvornikoff et al. | Dec. 22, 1953 |
| 2,663,723 | Bland | Dec. 22, 1953 |
| 2,692,891 | Young | Oct. 26, 1954 |
| 2,784,207 | Geoghegan et al. | Mar. 5, 1957 |

OTHER REFERENCES

Toy: J. Am. Chem. Soc., 73, 4670–4674 (1951).